(No Model.) 3 Sheets—Sheet 1.
H. D. WINTON.
ELECTRIC INSULATOR.
No. 352,436. Patented Nov. 9, 1886.
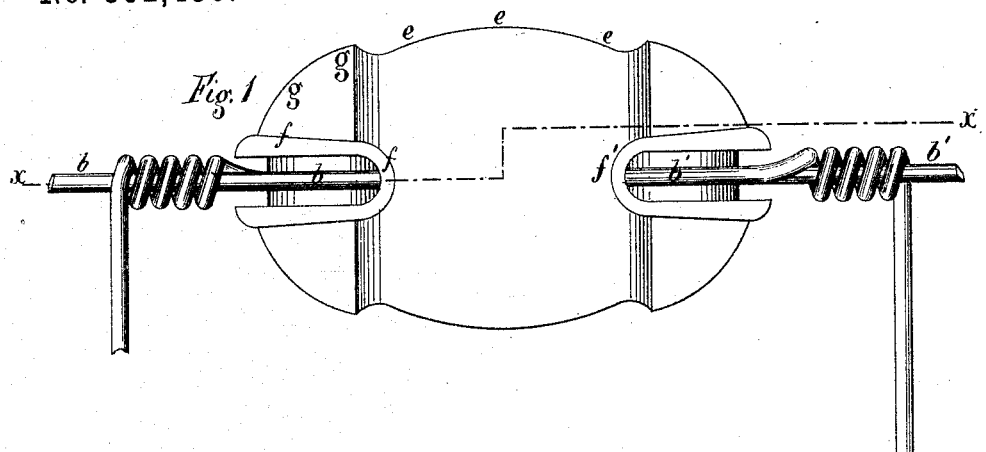
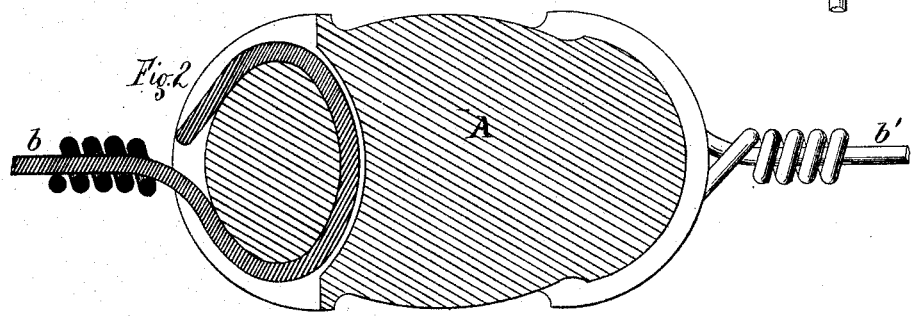
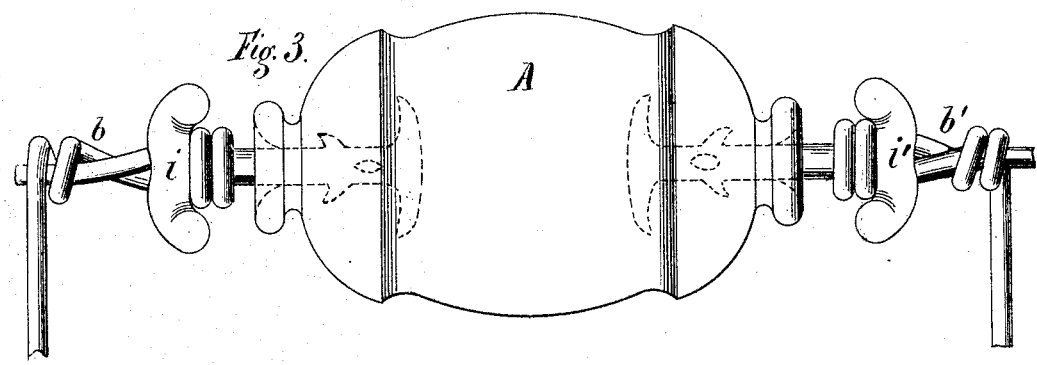
WITNESSES:—
W. H. Weightman
Alfred A. Wolff
INVENTOR:—
Henry D. Winton,
By J. D. Coppens,
Atty.

(No Model.) H. D. WINTON. 3 Sheets—Sheet 2.
ELECTRIC INSULATOR.
No. 352,436. Patented Nov. 9, 1886.
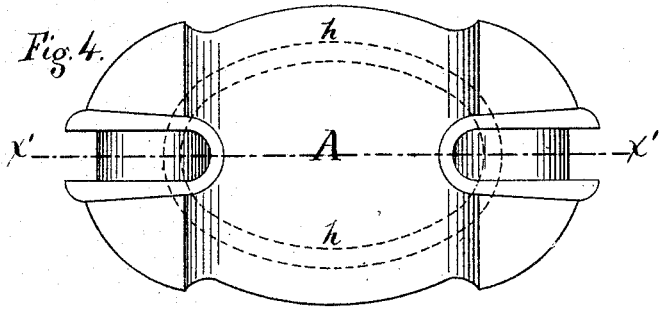
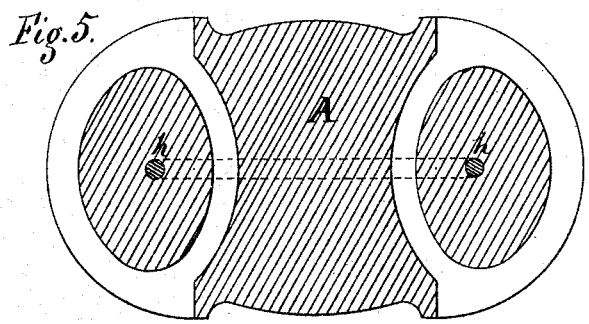
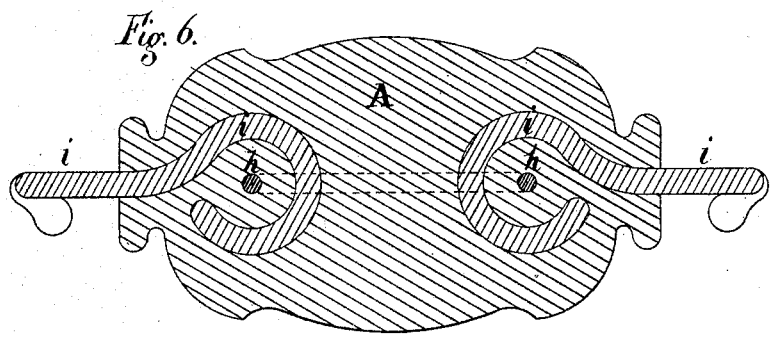
WITNESSES:—
INVENTOR:—
Henry D. Winton,
By S. D. Cozzens,
Atty.

(No Model.) 3 Sheets—Sheet 3.

H. D. WINTON.
ELECTRIC INSULATOR.

No. 352,436. Patented Nov. 9, 1886.

WITNESSES:—
W. H. Wightman
Alfred A. Wolff

INVENTOR:—
Henry D. Winton,
By S. D. Coggens,
Atty.

UNITED STATES PATENT OFFICE.

HENRY D. WINTON, OF WELLESLEY HILLS, MASSACHUSETTS.

ELECTRIC INSULATOR.

SPECIFICATION forming part of Letters Patent No. 352,436, dated November 9, 1886.

Application filed September 10, 1884. Serial No. 142,558. (No model.)

*To all whom it may concern:*

Be it known that I, HENRY D. WINTON, of Wellesley Hills, in the county of Norfolk and State of Massachusetts, have invented certain new and useful Improvements in Electric Insulators; and I hereby declare that the following is a full, clear, concise, and exact description of the same, reference being had to the drawings which accompany and form part of this specification.

These improvements relate to insulators for overhead telegraphic and electric lines, and they are designed especially for use in looping into circuit electric lamps, telephones, and telegraphic and other electric instruments, although they are also adapted for employment in other situations and for other purposes.

My invention consists in a telegraphic insulator which is molded or otherwise formed into such a shape that it will readily shed rain and moisture, and which is so constructed that at each end of it a wire or other conductor making part of an electric circuit can be securely attached in such manner that the end of the conductor may drop below the insulator or be carried above or around it, and be connected with an electric lamp or other instrument desired to be looped into the circuit.

It further consists in combining with an insulator for overhead lines a metallic ring or other equivalent device molded within the insulator or caused to encircle it in such a manner that if the insulator should break its parts would be held together and the wires of the line prevented from falling to the ground.

Figure 7:
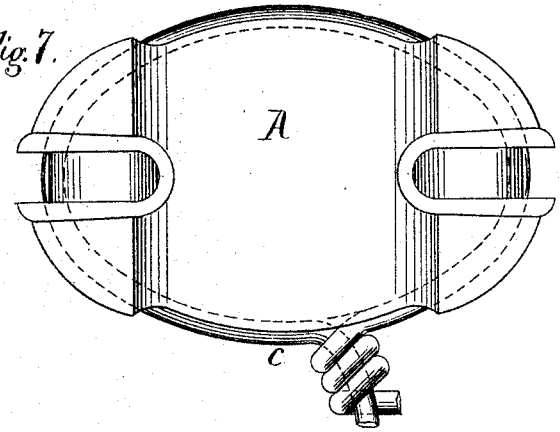
Figure 8:
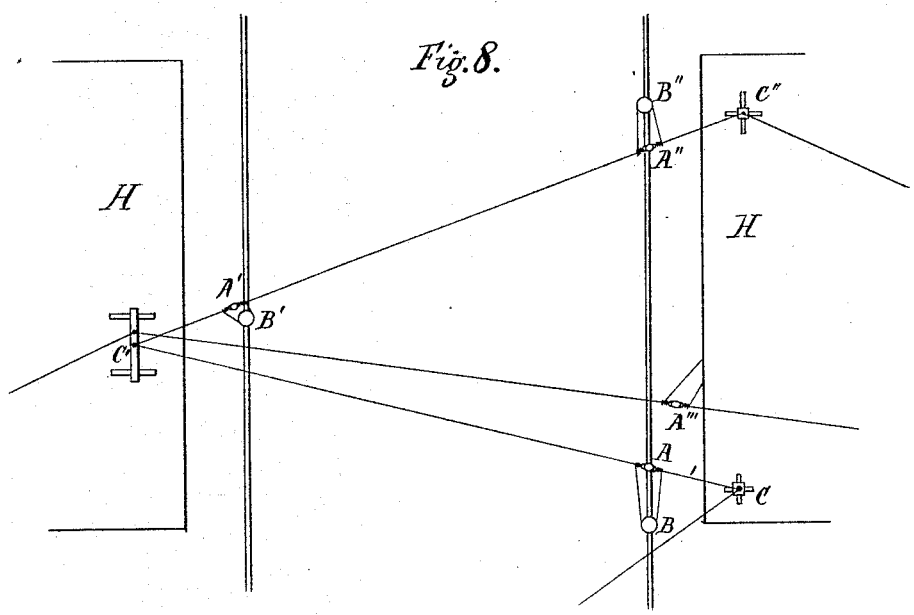

In the drawings, Figure 1 is an elevation of one form of my improved insulator, showing portions of wires attached to it to illustrate the manner in which they may be secured. Fig. 2 is a section taken on the line $x$ $x$ in Fig. 1. Fig. 3 is an elevation of another nearly similar insulator provided at its ends with metallic hooks, to which the wires may be attached, as shown, in place of running them through holes, as in Fig. 1. Fig. 4 illustrates the second part of my invention, and represents an insulator like Fig. 1, combined with a metallic ring in the interior of it for strengthening the insulator and holding the parts of it together in case it should break. Fig. 5 is a section taken on the line $x'$ $x'$ of Fig. 4. Fig. 6 is a sectional view of an insulator like Fig. 3, showing the strengthening-ring applied thereto. Fig. 7 represents an insulator of the same form as Fig. 1, provided with a metallic ring or hoop encircling its exterior for the same purpose as the interior ring of Figs. 4, 5, and 6. Fig. 8 illustrates the manner in which my improvements may be employed in practice.

Similar letters of reference in the different figures indicate similar parts.

A, Fig. 1, is a telegraphic insulator, which is molded or otherwise formed into such an exterior contour as will be well adapted to shed rain and moisture readily. At each end of the insulator a hole is made, and through these holes the wires $b$ and $b'$, which constitute part of an overhead line, are passed in such a manner that their ends may be carried back a short distance along the main portion of the line and twisted around it, so as to firmly secure the wires to the insulator, and then be allowed to drop down below the insulator, or be carried above or around it, for attachment to an electric lamp or other instrument which is to be looped into the circuit. The mode in which this is effected will be understood at once on examination of the figure.

In order to protect the wires as much as possible from moisture, I form lips or projections $f$ $f'$ at each end of the insulator, which, as shown in the figures, should substantially cover those portions of the wires which are or may be in contact with the insulator. By this mode of construction it will be seen that rain or moisture which may fall or settle on any of the points $e\ e\ e$ will run or drip down the face of the insulator and drop off, and that it will be prevented from coming in contact with the wires by striking on the lips $f$ $f'$, the curved exteriors of which it will follow round until it reaches their under sides, when it will drop off. The same will be true of moisture which falls upon the points $g$ $g$, as it will run down the curved face of the insulator until it reaches the lips $f$ $f'$, the curved exteriors of which it will follow, as in the other case, until it reaches their under sides and drops off.

Figs. 4, 5, and 6 illustrate different modes of carrying out the second part of my invention, which consists in combining with the insulator means for strengthening it and securing the wire against falling to the ground in case the insulator should break, or the metallic hooks shown in Fig. 3 be from any cause drawn out. In Figs. 4 and 5 a metallic ring is represented as molded into the center of the body of an insulator constructed like Fig. 1, and so arranged that it connects and binds together those parts of the insulator which lie between the points where the insulator sustains the strain of the conducting-wires. The insulator is thus strengthened and enabled to withstand a great longitudinal strain, and as the parts of it to which the wires are attached are strongly held together by the ring there will be no danger of the line falling to the ground in case the insulator should break. In Fig. 6 the re-enforcing ring is shown arranged so that it runs through the inner ends of the metallic hooks $i\ i$ of an insulator like Fig. 3, and thereby holds the parts of the insulator so that the lines cannot fall if the hooks should pull out or the insulator break.

Fig. 7 represents a simpler mode of re-enforcing the insulator against breakage. In this form of construction the insulator is provided with a longitudinal slot or groove around its exterior, and into this is placed and secured a wire or metallic hoop, $c\ c$, which encircles the body of the insulator and guards against the effects of breakage.

In Fig. 8 I have illustrated the practical application of my invention. H H represent roofs of buildings on different sides of a street. C C' C'' are fixtures of the ordinary character for the attachment of electric wires. A A' A'' are my improved insulators, located as they should be when properly placed in the line—that is to say, substantially directly over the lamp or other instrument which they are to loop in. B B' B'' are electric lamps arranged at intervals along the street. An ordinary telegraphic or electric wire or cable, 1, brought to the fixture C, is secured thereto and carried the desired distance for locating the lamp B. The insulator A is then placed in the line just over the lamp, or nearly so, and the wire is attached to each end of it and the dropped ends connected with the lamp B, in the manner hereinbefore described, and clearly shown in the figure. The lamp is thus looped into the circuit, and the wire is then run across the street to the fixture C', to which it is secured, and is carried the desired distance for locating the lamp B'. The insulator A' is placed in the line and the wire is attached to it, and the dropped ends of the former connected with the lamp B' in the same manner as already described. The wire is then run across the street to the fixture C'' and the same operation is repeated. In a similar manner, when desired, a wire can be run into a building, and by means of one of my insulators placed in the line, as shown at A''', an instrument of any kind—such as a telegraph-instrument, a telephone, or a stock-indicator—can readily be looped into a circuit.

I do not limit myself to any particular material for the insulators. They may be made of glass, porcelain, india-rubber, gutta-percha, or any other suitable substance.

I have not described, and in the present Letters Patent I do not claim, the form of my improved insulators which is illustrated in Fig. 3 of the drawings, as that constitutes the subject of other Letters Patent granted to me of even date herewith, and to which reference is made.

Having thus described my improvements, what I claim, and desire to secure by Letters Patent, is—

1. The combination, with the line of a telegraphic or other electric circuit, of an insulator having conducting-wires attached to its extremities, and provided with lips or projections which are formed on the faces of the insulator around the points of contact of the wires with the latter, and are adapted to protect the wires from rain or moisture, substantially as described.

2. An electric insulator combined with a re-enforcing metallic ring or hoop molded into the interior of it and passing through and binding together those parts of the insulator which lie between the points where the insulator sustains the strain of the conducting-wires, substantially as set forth.

3. The new article of manufacture consisting of an electric insulator made of glass, porcelain, or other suitable material, provided at its extremities with means for the attachment to it of conducting-wires, and also with lips or projections for shedding rain or moisture, substantially as described.

HENRY D. WINTON.

Witnesses:
F. A. DEARBORN,
G. HOMER GREEN.